Patented Nov. 27, 1923.

1,475,563

UNITED STATES PATENT OFFICE.

BENJAMIN TALBOT BROOKS, OF BAYSIDE, NEW YORK, ASSIGNOR TO MATHIESON ALKALI WORKS, OF NEW YORK, N. Y., A CORPORATION OF NEW YORK.

PURIFICATION OF BRINES.

No Drawing.　　Application filed February 8, 1921.　Serial No. 443,434.

*To all whom it may concern:*

Be it known that I, BENJAMIN T. BROOKS, a citizen of the United States, residing at Bayside, in the county of Queens, State of New York, have invented certain new and useful Improvements in the Purification of Brines; and I do hereby declare the following to be a full, clear, and exact description of the invention, such as will enable others skilled in the art to which it appertains to make and use the same.

This invention relates to improvements in the purification of brine, as well as improvements in the ammonia soda process.

Natural brines almost invariably contain salts of calcium and magnesium, mainly the sulfates and chlorides. In the purification of brine for the manufacture of pure table salt and other purposes, it is common practice to remove the calcium and magnesium by the addition of sodium carbonate, thus precipitating the calcium and magnesium as carbonates, which are removed by filtration or sedimentation. To the extent that gypsum and magnesium sulfate were originally present, sodium sulfate is formed and will remain in the solution. It is common practice to treat the solution with barius chloride which removes the sulfate radical as insoluble barium sulfate, forming corresponding amounts of sodium chloride in solution, so that the solution then contains practically nothing but sodium chloride.

In the ammonia soda process, it is distinctly advantageous, not only to free the brine from calcium and magnesium and from the sulfate radical, but also to add a small amount of ammonium sulfide to the brine to prevent corrosion of the iron apparatus thereby. This corrosion is due largely to the ammonium chloride formed in the process from the interaction of the sodium chloride, carbon dioxide and ammonia.

The purification of brine in the manner above described requires the production of barium chloride as one of the reagents required; while ammonium sulfide must likewise be separately produced for use as a reagent if the apparatus is to be protected from corrosion in the ammonia soda process in the manner above indicated. While the amounts of these reagents required is not large, relatively to the total amount of the brine, nevertheless, where the brine treated amounts to hundreds of thousands of gallons, the reagents are required in amounts which are large in the aggregate and amount to several tons of reagents per each million gallons of brine.

According to the present invention the brine is purified in a simple and advantageous manner, and a purified brine is produced which can be directly used in the ammonia soda process without the necessity of adding ammonium sulfide thereto. I have found that it is possible to do away not only with the separate addition of ammonium sulfide to protect the apparatus during the ammonia soda process, but also to do away with the separate production and addition of barium chloride, and that the brine can be directly purified and protected by treating it with barium sulfide, either before or after calcium and magnesium have been precipitated as carbonates by the addition of sodium or ammonium carbonates. The treatment of the brine with barium sulfide can be carried out after the brine has been preliminarily treated for the removal of calcium and magnesium therefrom; or the brine can be directly treated with barium sulfide without preliminary removal of calcium and magnesium, and the calcium and magnesium can then be subsequently removed, preferably in conjunction with the operation of the ammonia soda process.

I have found that barium sulfide acts in an entirely satisfactory manner to precipitate the sulfate radical from the strong brine as barium sulfate. I have also found that the sodium sulphide, formed by the interaction of the barium sulfide and sodium sulfate, functions in an entirely satisfactory manner in preventing the corrosion of the apparatus in the ammonia soda process, the sodium sulfide being present in sufficient amount for this purpose without any objectionable excess.

According to one method of carrying out the process of the present invention, I first treat the brine with sodium carbonate to precipitate calcium and magnesium therefrom as carbonates leaving sodium sulfate in solution, and I then treat the brine with barium sulfide to precipitate the sulfate radical as barium sulfate and leave sodium sulfide in solution. The improved process of the present invention enables a considerable saving to be effected in the purification process, inasmuch as the much cheaper sulfide takes the place not only of the barium chloride but also of the ammonium sulfide. The present process therefore accomplishes, with a single reagent and in a single operation, a result comparable with that heretofore obtained with two separate reagents and by two separate operations. The expense of the separate production of ammonium sulfide, as well as the necessity for the treatment of the brine therewith, are thus avoided, while the production of the more expensive barium chloride as a reagent is similarly avoided; and the apparatus is nevertheless protected in the ammonia soda process by the sodium sulfide introduced therein in the manner above described. The treatment of the brine with a single reagent (i. e., barium sulfide), therefore, accomplishes two separate purposes at one operation, namely, the removal of the sulfate from the brine and the introduction of a protective soluble sulfide, i. e., sodium sulfide. The process is advantageous not only in conjunction with the ammonia soda process, but in other manufacturing operations where the process of a soluble sulfide in the brine is desirable or unobjectionable.

The preliminary treatment of the brine with sodium carbonate for the removal of calcium and magnesium can be carried out in much the same way as in present practice, using the sodium carbonate in the form of soda ash. The brine can thus be passed continuously at a fixed or regulated rate, into a series of precipitating and settling tanks, into the first one of which is continuously fed a definite quantity of soda ash in the form of a concentrated water solution, or the soda ash may be used in a finely powdered form, since it readily goes into solution. The use of the dry soda ash is preferable as it avoids dilution of the brine. The tanks should be of such size, as compared with the rate of flow of the brine, that clear brine will flow from the last tank in the series, and a thick pasty precipitate of the calcium and magnesium carbonates can be slowly pumped from the bottom of the tank at the opposite end of the series.

As a typical example, 450,000 gallons of natural brine, containing about 9.4 tons of calcium sulfate, are first treated with sodium carbonate in the manner above described, and thereby freed from calcium by precipitation of calcium carbonate, leaving sodium sulfate in solution. The brine is then treated with about 11.6 tons of barium sulfide, which is preferably added in the form of a hot concentrated solution containing about 24% barium sulfide. The barium sulfide reacts with the sodium sulfate and forms about 16 tons of barium sulfate precipitate. This precipitation of the barium sulfate can advantageously be carried out in a series of settling tanks into which the brine freed from calcium and magnesium is fed continuously, and into the first of which the barium sulfide solution is added in a regulated flow. The clear brine, containing the protective sodium sulfide, will thus be obtained, freed from sulfates and well adapted for use in the ammonia soda process. It can then be passed to the absorption towers and treated with ammonia and carbon dioxide in much the usual way.

Instead of treating the brine for the preliminary removal therefrom of calcium and magnesium, before the treatment of the brine with barium sulfide, the brine can be directly treated with barium sulfide, to separate the sulfate radical therefrom in the form of insoluble barium sulfate, and the calcium and magnesium can be subsequently removed. When barium sulfide is thus added to the brine as the first step in the process of purification, the precipitated barium sulfate is apt to contain a little barium carbonate and may be somewhat discolored by ferric hydroxide, but it can be purified by washing with hydrochloric acid to give a product of increased purity.

The removal of calcium and magnesium can be advantageously combined with the ammonia soda process itself. In that process, when ammonium carbonate is expelled from the ammonium soda liquors, it is absorbed in fresh brine. By using the brine that has been treated with barium sulfide, which still contains calcium and magnesium, for this absorption, the carbon dioxide so absorbed can be utilized for the precipitation and removal of the calcium and magnesium as carbonates. The purified brine can then be used in the usual way in the ammonia soda process.

The purification process of the present invention gives precipitated barium sulfate as one of its products. Where the brine is preliminarily treated with sodium carbonate and subsequently with barium sulfide, the barium sulfate will ordinarily be obtained directly in a state of high purity, and, after washing and drying, is available for use for various purposes, for example, as a paint pigment. If the barium sulfate is contaminated with impurities, as in the case where the treatment with barium sulfide precedes the removal of calcium and magnesium, the barium sulfate can be suitably purified, if necessary or desirable, before use.

The barium sulfate may advantageously be used for the production of a further amount of barium sulfide therefrom by subjecting it to reduction, for example, by heating with carbon to a sufficient temperature, and the barium sulfide required for the treatment of the brine can thus be simply and directly produced from the barium sulfate resulting from the purifying operation. As thus carried out, the process partakes of a cyclic character in that the barium is repeatedly used. first in the form of barium sulfide for the purification of the brine from the sulfate radical, with formation of sodium sulfide in solution and of precipitated barium sulfate, and, second, as barium sulfate in the reduction operation for the reproduction of further amounts of barium sulfide. By carrying out the process in this cyclic manner it is only necessary to add such amounts of barium sulfide or of separately produced barium sulfate as are necessary to make up for such losses as are incident to the process.

The ammonia soda process, in case the purified brine is used in that process, can be carried out in substantially the same manner as usual. but without the necessity for the addition of ammonium sulfide, and with the presence in the brine of the sodium sulfide produced by the preliminary treatment thereof in the manner above described.

I claim:

1. The method of purifying brine, which comprises the step of treating the brine to to precipitate calcium and magnesium therefrom as carbonates in conjunction with the step of treating the brine with barium sulfide to remove sulfates therefrom, leaving a soluble sulfide in solution.

2. The method of purifying brine from soluble sulfates, which comprises treating the same with barium sulfide to form barium sulfate and a soluble sulfide in solution.

3. The improvement in the ammonia soda process, which comprises preliminary treating the brine with barium sulfide for the removal of sulfates therefrom and to give a soluble sulfide in solution, and supplying the resulting brine to the ammonia soda process.

4. The improvement in the ammonia soda process which comprises the steps of precipitating calcium and magnesium from the brine, and of purifying the brine from sulfates by the addition of barium sulfide thereto, with resulting precipitation of barium sulfate and formation of a soluble sulfide in solution, and supplying the purified brine to the ammonia soda process.

5. The improvement in the ammonia soda process, which comprises preliminarily treating the brine with barium sulfide, for the removal of sulfates therefrom and to give a soluble sulfide in solution, absorbing ammonium carbonate in the brine to cause precipitation of calcium and magnesium therefrom as carbonates, and supplying the resulting brine to the ammonia soda process.

In testimony whereof I affix my signature.

BENJAMIN TALBOT BROOKS.